Figure 1:
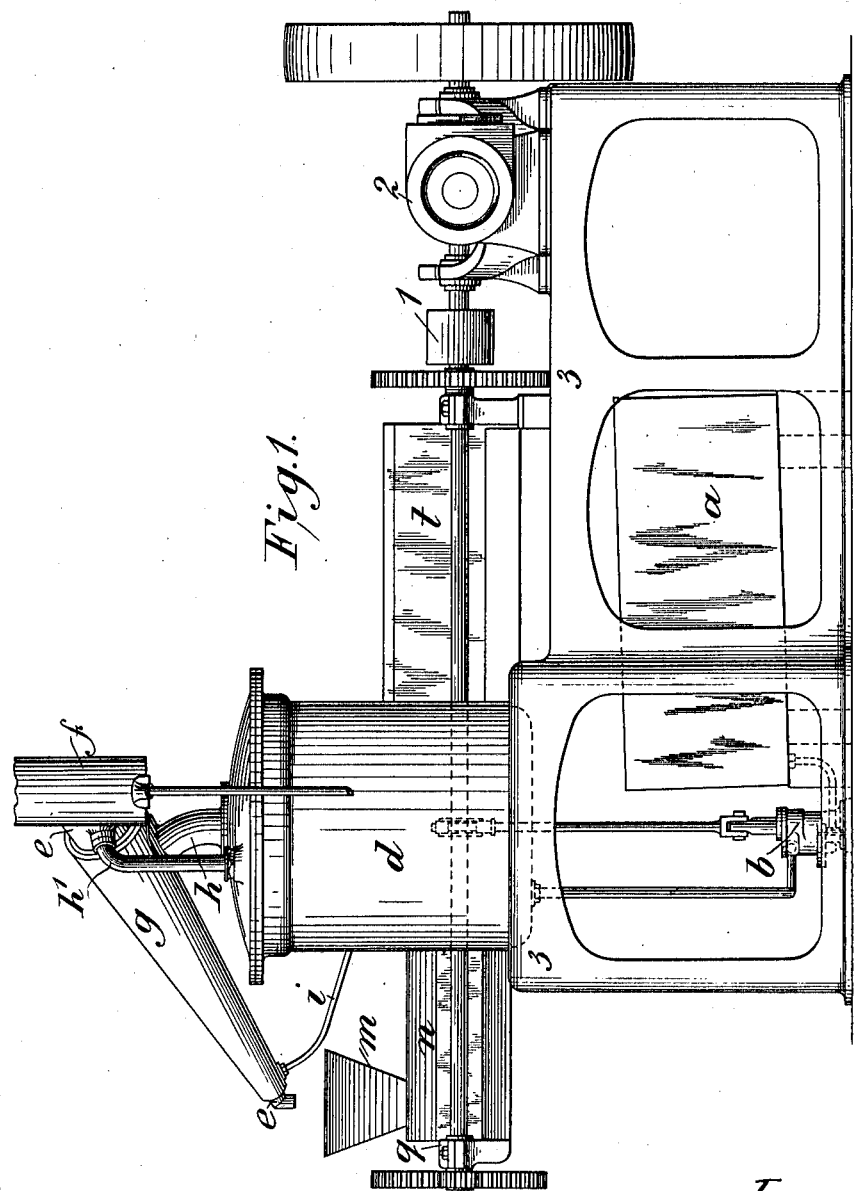

E. SHAW.
APPARATUS FOR THE TREATMENT OR PREPARATION OF SUGAR.
APPLICATION FILED DEC. 23, 1904.

957,113.

Patented May 3, 1910.
6 SHEETS—SHEET 1.

E. SHAW.
APPARATUS FOR THE TREATMENT OR PREPARATION OF SUGAR.
APPLICATION FILED DEC. 23, 1904.

957,113.

Patented May 3, 1910.

Witnesses.

Inventor.
Edward Shaw

E. SHAW.
APPARATUS FOR THE TREATMENT OR PREPARATION OF SUGAR.
APPLICATION FILED DEC. 23, 1904.

957,113.

Patented May 3, 1910.
6 SHEETS—SHEET 4.

E. SHAW.
APPARATUS FOR THE TREATMENT OR PREPARATION OF SUGAR.
APPLICATION FILED DEC. 23, 1904.

957,113.

Patented May 3, 1910.
6 SHEETS—SHEET 5.

E. SHAW.
APPARATUS FOR THE TREATMENT OR PREPARATION OF SUGAR.
APPLICATION FILED DEC. 23, 1904.

957,113.

Patented May 3, 1910.
6 SHEETS—SHEET 6.

Witnesses.
J. H. Ramsay Field
James A. Baker

Inventor.
Edward Shaw

UNITED STATES PATENT OFFICE.

EDWARD SHAW, OF LONDON, ENGLAND.

APPARATUS FOR THE TREATMENT OR PREPARATION OF SUGAR.

957,113.  Specification of Letters Patent.  Patented May 3, 1910.

Application filed December 23, 1904. Serial No. 238,079.

*To all whom it may concern:*

Be it known that I, EDWARD SHAW, a subject of the King of Great Britain and Ireland, residing in the city of London, England, have invented Improvements in Apparatus for the Treatment or Preparation of Sugar, of which the following is a specification.

This invention has for object to provide apparatus for the treatment or preparation of sugar, more particularly of the class of sugar which is known in Portugal as "*assucar areado*" (aerated sugar), in Brazil as "*assucar refinado*" (refined sugar) and in the East as "basket sugar" and which possesses the characteristic properties of very ready solubility, lightness, a marked tendency, when heaped up, to fall away until its appearance resembles that of loose snow and when rubbed between the fingers feels smooth, while when it has been pressed and rubbed with a smooth material such as note paper presents a uniform surface. This kind of sugar has heretofore usually been produced by hand in small batches.

Apparatus according to this invention is designed to enable sugars of this kind to be produced in large quantities, quickly, economically and with reasonable certainty that the sugar produced will be of the character or quality desired.

In apparatus according to this invention the sugar or sugar juice to be treated or refined, after a preliminary treatment usually consisting of warming it up with water in a melting or "blow-up" pan from which it is drawn off and, if it is desired to improve its clearness or color, passed through filters, which clarify it and remove all suspended impurities, is boiled by forcing it through an externally steam-heated pipe or coil at a suitable speed; the steam pressure or the speed of the pump, or both being regulated according to the temperature to which the syrup is to be heated, and the conditions under which the water is to be evaporated, from which it is delivered into a machine wherein it undergoes its final treatment.

The boiling machine employed is preferably of the type known as "Eureka" machines wherein the syrup is forced through a steam heated coil; these machines are described in the specifications of former British Letters Patent granted to me No. 24742 of 1893, No. 5803 of 1898, No. 19262 of 1898, No. 19957 of 1898 and No. 21300 of 1898. The steam separator of the boiling machine is provided with a steam jacketed delivery pipe connected to its lower end so that a stream of syrup can be delivered into a machine constructed as hereinafter described.

In some cases, I might have a vacuum in the separator and remove the syrup by a pump or by a vertical pipe say twenty feet high and gravity.

The time taken from the moment when the mixture enters the steam heated pipe or coil until it and the steam produced from the water in the syrup are forced out of the pipe or coil, may vary say from five seconds to a minute, according to the temperature, but preferably lower temperatures and longer times are adopted to avoid discoloration. The water is converted into steam and the sugar is delivered at a temperature of about 260 degrees Fahr. The temperature at which the sugar is delivered may vary within considerable limits according to the prominence it is desired to give to any particular characteristic property or properties of the sugar produced; it may be as high as about 290° for producing a loose powdery sugar. The higher the temperature the drier or more powdery will be the sugar produced, while lower temperatures will result in sugars of a more moist character being produced.

The finishing machinery or apparatus is designed with the object of submitting the sugar to treatment adapted to cause crystallization and of maintaining sufficient heat to throw off such a proportion of the water, that, when the treated or refined sugar leaves the machine, it contains only that amount of moisture necessary to give it the desired properties. Such apparatus comprises an inclosed mixing chamber or trough through which the syrup is passed and wherein crystallization is effected in such wise that the mass delivered from it is evenly crystallized throughout, no portion of it having been allowed to cool unduly. The crystallized mass is then passed through another chamber or trough comprised in the apparatus, wherein it is stirred and broken up, steam being thus allowed to escape, but loss of heat from other causes being retarded, the syrupy mass during its passage through this chamber or trough gradually changing into more or less dry aerated sugar of the required character.

It will be understood that with apparatus according to this invention the whole process of sugar treatment is so rapid that there is scarcely any increase in the proportion of invert sugar in the finished product over that existing in the syrup before boiling.

Apparatus for treating or producing sugar as hereinbefore described can be variously constructed and arranged.

Figure 2:
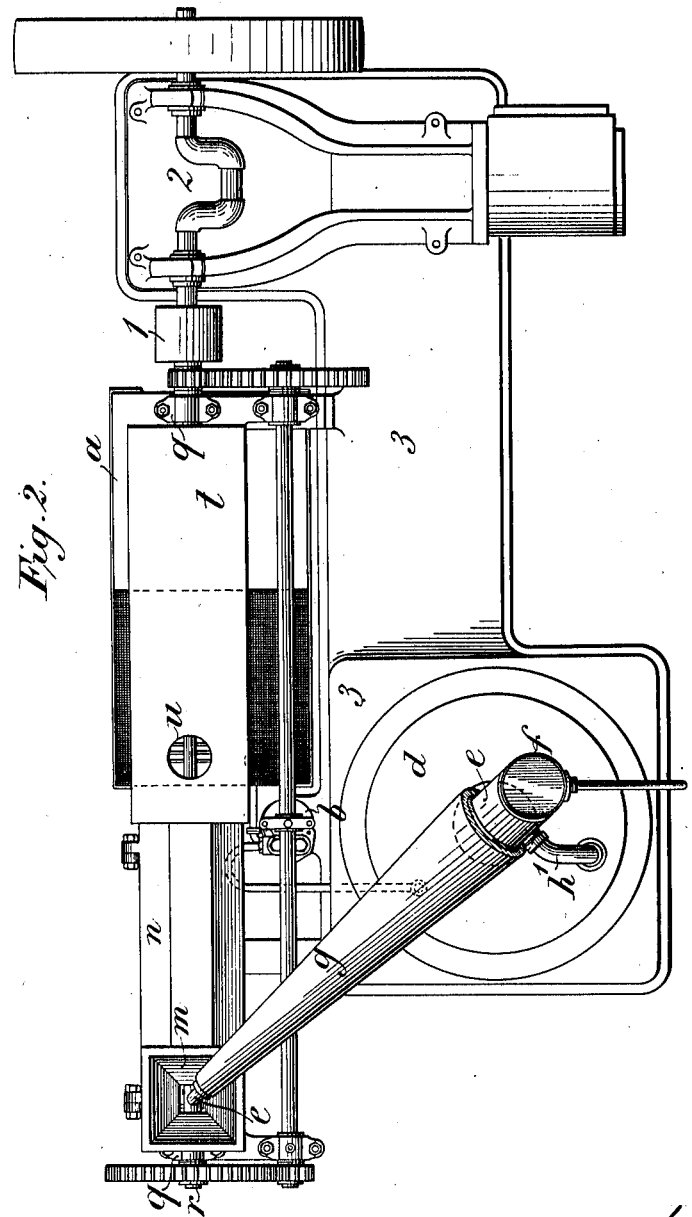
Figure 3:
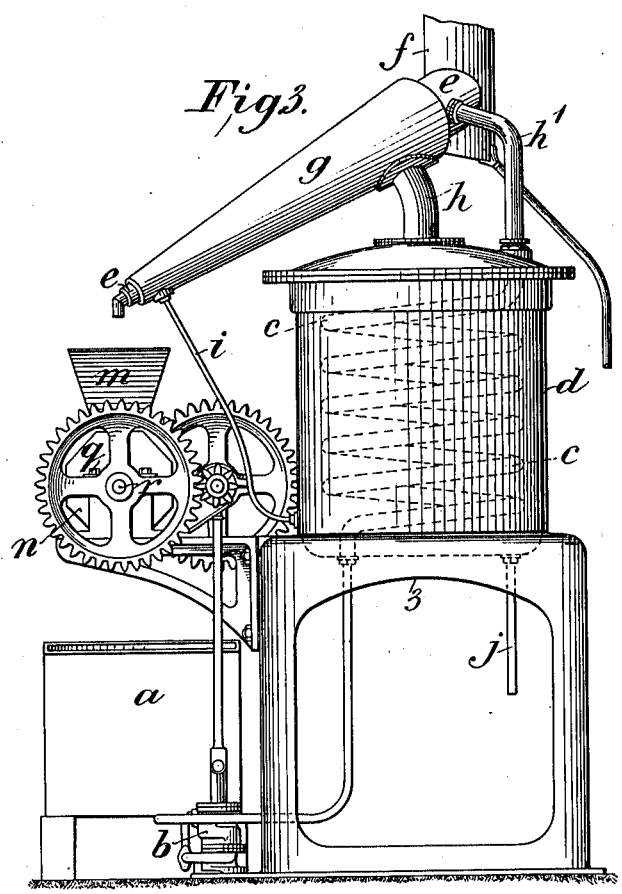
Figure 4:
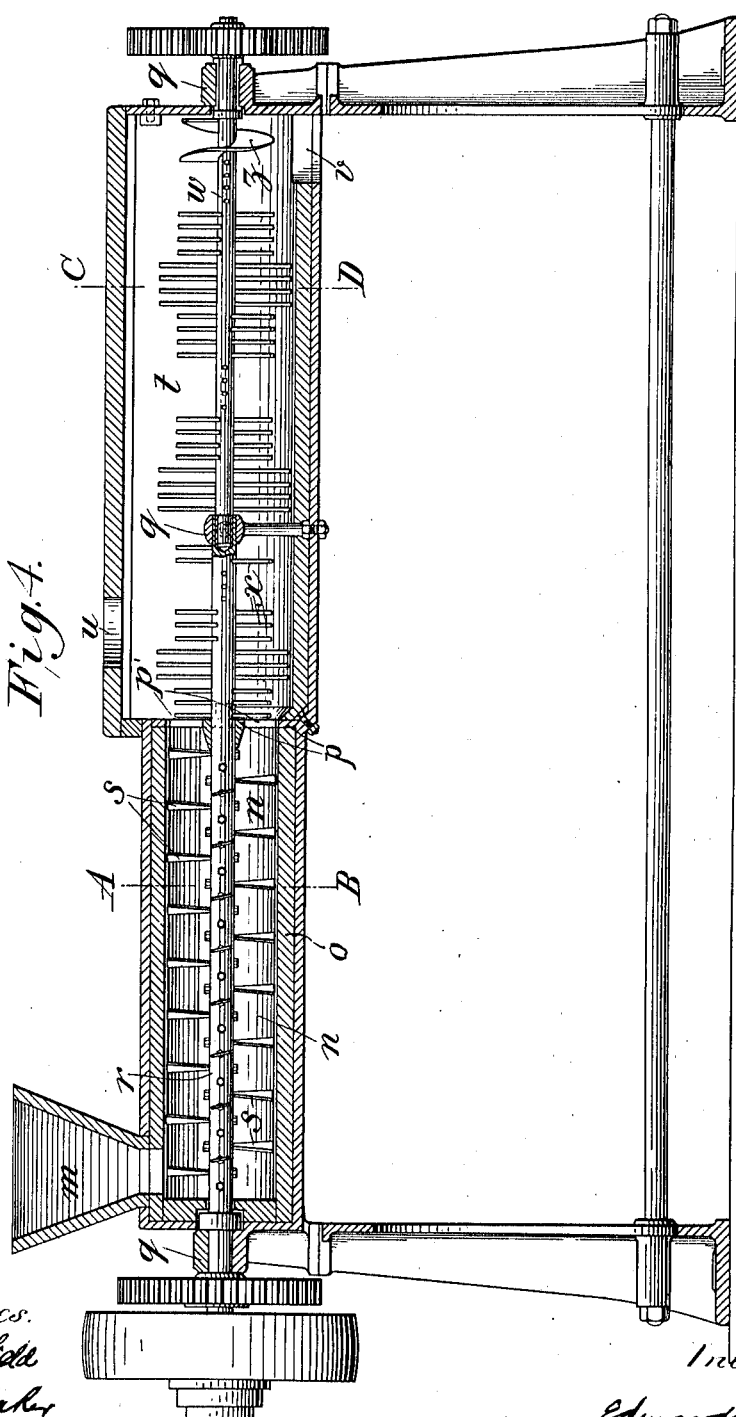
Figure 5:
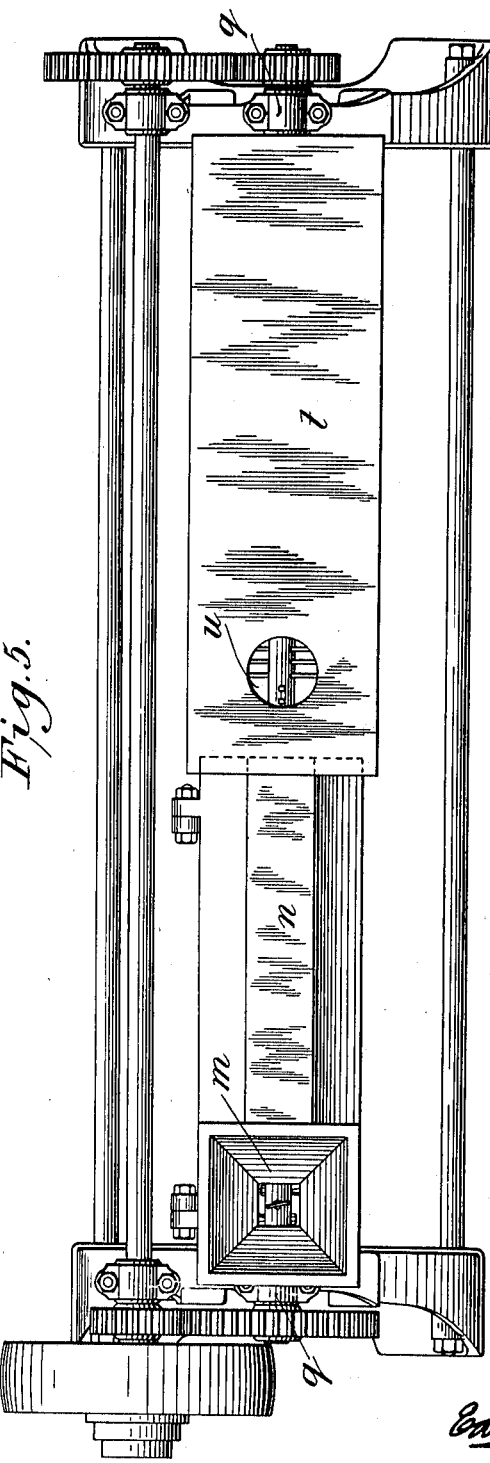
Figure 6:
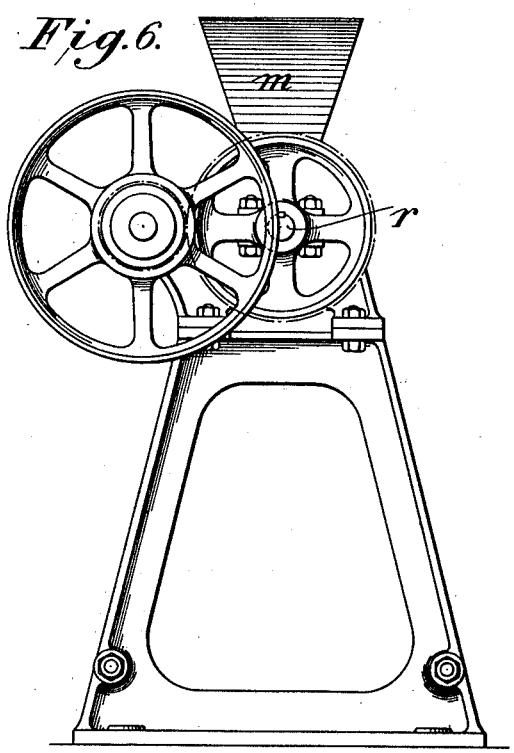
Figure 7:
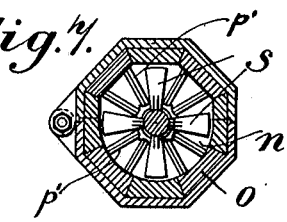
Figure 8:
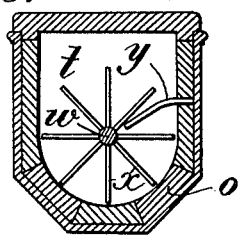

Figures 1, 2 and 3 of the accompanying illustrative drawings show by way of example, in side elevation, plan and end elevation, respectively, a boiling machine and an engine-driven finishing machine arranged in combination. Fig. 4 is a longitudinal vertical section, Fig. 5 a plan and Fig. 6 an end elevation of a belt-driven finishing machine of similar construction to that shown in Figs. 1 to 3 inclusive. Figs. 7 and 8 are transverse sections corresponding to the lines A, B, and C, D, respectively, of Fig. 4.

$a$ is a supply tank into which the mixture of syrup and invert sugar is delivered, $b$ a pump adapted to force syrup from the tank $a$ through a coil of copper pipe $c$ located in a steam heated chamber $d$. From the coil $c$ the boiled syrup is discharged into an inclined steam jacketed vessel $e$, through a pipe $h^1$, in which separation of the steam from the syrup is effected; the steam escaping from the open upper end of the vessel $e$ into a vertical uptake $f$ and the syrup passing out at the lower end of the vessel. The temperature within the chamber $d$ is controlled according to the rate at which the syrup is driven through the coil $c$ and the amount of boiling to which it is desired to submit the syrup. As well as, or instead of controlling the temperature within the chamber $d$, I may in some cases control the speed of the pump $b$. Steam is supplied to the jacket $g$ of the vessel $e$ from the chamber $d$ through a pipe $h$ and the lower end of the jacket is in communication with the lower end of the chamber $d$ through a drain pipe $i$.

$j$ is a drain pipe from the chamber $d$.

Boiled syrup from the separating vessel $e$ enters the hopper $m$ of a machine comprising two parts, (see Figs. 4 to 8), the first of which is in the form of a long chamber or closed trough $n$ from which heat is prevented from escaping as by an internal lagging $o$ of wood. The hopper $m$ is at one end of this chamber or trough and at the other end thereof is a plate or disk $p$ comprising a marginal part connected to a central part or boss by arms $p^1$ formed with holes therethrough. Within the chamber or trough $n$ and mounted in bearings $q$ is a rotating shaft $r$ provided with screw blades or paddles $s$ adapted gradually to feed the syrup from the inlet to the outlet of the chamber or trough and at the same time thoroughly mix it so that it gradually becomes more completely and evenly crystalline throughout as it advances along the chamber or trough and this without any material loss of heat. The portion which has already become crystalline spreads the crystallization through the material following it and in commencing work the formation of crystals in the mass may be promoted by putting into the mixing chamber or trough a quantity of finished sugar preferably of the kind to be produced. From the chamber or closed trough $n$ the crystallized mass is delivered, at a temperature more or less approaching that at which the syrup entered it, into a second chamber $t$, which is also so constructed that loss of heat by conduction is retarded but which is formed with an outlet $u$ for steam. This chamber is formed with a discharge outlet $v$ at one end and in the chamber is mounted a rotating shaft $w$ provided with a number of arms or pins $x$ adapted to stir and break up the crystalline sugar and allow it to throw off in the form of steam such a proportion of the contained water that the finished sugar contains only the amount of moisture needed to give it the required properties. The arms $p^1$ (Fig. 7) between the openings of the plate or disk $p$ somewhat restrict the communication between the chambers $n$ and $t$. The arms or pins $x$ work between fixed inwardly projecting pins $y$ (Fig. 8) in the chamber to insure the breaking up of any lumps in the sugar. To cause the sugar to travel through this chamber the shaft $w$ may, as shown, be provided at its outer end with a screw blade or paddle $z$.

In the arrangement illustrated in Figs. 1 to 3 inclusive the shafts $r$ and $w$ are driven through a clutch 1 from an engine 2 mounted on a frame 3 that also supports the boiling apparatus and finishing machine.

Cane juice if dealt with, by apparatus such as hereinbefore described, immediately after crushing the cane, can be separated into steam and dried sugar, the latter containing the whole of the cane juice, invert sugar and other constituents in the juice.

This invention enables "aerated" sugar to be produced from cane juice without the removal therefrom of any of the impurities, or, after the acid has been neutralized and the coarser impurities removed, or, it may be, after further impurities such as albumen have been removed and only cane and invert sugars are left, also, by this invention, sugar may be produced of better color than that of the syrup dealt with.

The refined sugar can be pressed into small cubes, tablets, or flakes.

By this invention aerated sugars may be produced from ordinary white crystalline or granulated sugars, yellow sugars or raw sugars, moreover the sugar produced is of better color than that of the syrup dealt with.

Although specially relating to the production of aerated sugar the hereinbefore described invention may be adopted for producing other sugars.

What I claim is:—

1. In apparatus for the treatment of sugars of the kind referred to, an inclosed chamber adapted to receive heated syrup, means for retarding the cooling of syrup within said chamber, means for stirring heated syrup within said chamber, a second chamber arranged in line with said first mentioned chamber, a restricted communication between the two said chambers and means for feeding forward syrup in said chambers.

2. In apparatus for the treatment of sugars of the kind referred to, an inclosed chamber adapted to receive heated syrup, means for retarding the cooling of syrup within said chamber, a second chamber arranged in line with said first mentioned chamber, a restricted communication between the two said chambers, a rotary shaft extending through both said chambers and blades on said shaft adapted to stir syrup within said chambers and to feed it forward.

3. In apparatus for the treatment of sugars of the kind referred to, an externally steam heated pipe, means for forcing syrup therethrough, means for separating the steam from the syrup as it leaves the heated pipe, an inclosed chamber into which heated syrup from said pipe is delivered, means for stirring heated syrup within said chamber, a second chamber arranged in line with said first mentioned chamber, a restricted communication between the two said chambers and means for feeding forward syrup in said chambers.

4. In apparatus for the treatment of sugar, a closed trough internally lagged with wood, a hopper communicating with said trough near one end thereof, a second trough partially lagged with wood communicating with that end of said closed trough remote from said hopper, a perforated plate between the two said troughs, a steam outlet from said second chamber, an outlet from said second chamber for crystalline sugar, a rotary shaft extending through both said troughs, means for rotating said shaft, blades on said shaft within said closed trough adapted to feed forward the material toward said second trough, blades on said shaft within said second trough adapted to break up the material, and a screw blade on said shaft within said second trough adapted to cause the material to travel therethrough.

5. In apparatus for the treatment of sugar, a syrup supply tank, a steam heated chamber, a coil of pipe located within said steam heated chamber, a pump adapted to force syrup from said tank through said coil, an inclined steam jacketed vessel into which said coil discharges, a pipe at the upper end of said jacketed vessel through which steam is led away, a hopper arranged to receive syrup from said inclined vessel, an inclosed mixing chamber with which said hopper communicates, and through which the syrup is passed and which is adapted to retard the dissipation of heat, a second chamber receiving the crystallized mass from said inclosed mixing chamber, a steam outlet from said second chamber, and means for stirring and breaking up the crystallized mass in said second chamber.

6. In apparatus for the treatment of sugar, a syrup supply tank, a steam heated chamber, a coil of pipe located within said steam heated chamber, a pump adapted to force syrup from said tank through said coil, an inclined steam jacketed vessel into which said coil discharges, a pipe at the upper end of said jacketed vessel through which steam is led away, a hopper arranged to receive syrup from said inclined vessel, a closed chamber with which said hopper communicates, means for retarding the escape of heat from said chamber, means adapted to gradually feed the syrup from the inlet to the outlet of said chamber and to gradually mix it, a second chamber communicating with said closed chamber formed with an outlet for steam and an outlet for the crystalline sugar, means for retarding the loss of heat by conduction from said second chamber, means for breaking up the sugar mass delivered into said second chamber, and means for causing the sugar to travel through this second chamber.

Signed at London, England, this 10th day of December, 1904.

EDWARD SHAW.

Witnesses:
J. H. Ramsay Field,
H. D. Jameson.